United States Patent [19]

Mastors et al.

[11] Patent Number: 5,832,512
[45] Date of Patent: Nov. 3, 1998

[54] APPARATUS AND METHOD FOR FILE NUMBER RE-MAPPING FOR DISCONNECTED OPERATIONS IN A CLIENT-SERVER NETWORK

[75] Inventors: Robert Mastors; Sam L. Faulkner, both of Colorado Springs, Colo.

[73] Assignee: Sun Microsystems, Inc., Palo Alto, Calif.

[21] Appl. No.: 631,933

[22] Filed: Apr. 15, 1996

[51] Int. Cl.[6] .................................................. G06F 17/30
[52] U.S. Cl. ................... 707/202; 395/181; 395/182.02; 395/182.03; 395/182.06; 395/182.13; 395/182.14; 395/182.22; 395/200.33
[58] Field of Search ................................... 395/618, 181, 395/182.02, 182.03, 182.06, 182.13, 182.14, 182.22, 200.33; 707/202, 201

[56] References Cited

U.S. PATENT DOCUMENTS

| | | | |
|---|---|---|---|
| 4,941,059 | 7/1990 | Grant | 395/618 |
| 5,113,519 | 5/1992 | Johnson et al. | 395/618 |
| 5,175,851 | 12/1992 | Johnson et al. | 395/618 |
| 5,218,695 | 6/1993 | Noveck et al. | 395/618 |
| 5,237,680 | 8/1993 | Adams et al. | 707/200 |
| 5,555,404 | 9/1996 | Torbjornsen et al. | 395/618 |
| 5,628,005 | 5/1997 | Hurvig | 395/608 |

FOREIGN PATENT DOCUMENTS

WO 95 24685
A  9/1995  WIPO ............................ G06F 17/30

OTHER PUBLICATIONS

Liskov et al., "Efficient recovery in harp", IEEE, pp. 104–106, Apr. 1992.

Mahadev Satyanarayanan, "Scalable, secure, and highly available distributed file access", IEEE, vol. 23, No. 5, pp. 9–21, May 1990.

IBM Technical Disclosure Bulletin, vol. 30, No. 10, Mar. 1988, p. 181, "Alias Naming for Remote Profiles", Armonk, NY.

Patent Abstracts of Japan, Publ. No. 63318647, Publ. Dec. 27, 1988 by the European Patent Office, Application No. JP 62155701.

Primary Examiner—Thomas G. Black
Assistant Examiner—Jean M. Corrielus
Attorney, Agent, or Firm—Homer L. Knearl; James A. Pinto; Holland & Hart LLP

[57] ABSTRACT

In a client/server computing environment where the server controls the creation and allocation of file numbers for newly created files, transparent creation by the client of new file numbers while the server is unavailable. A file number table is created and maintained in the client for storing and mapping file numbers. Responsive to requests for the creation of a new file while the server is unavailable, the client creates a new file number for the new file, stores it in the table, and maps it to the file number later assigned by the server. Conflicts between file numbers created by the server and client are also flagged, detected, and resolved.

20 Claims, 8 Drawing Sheets

APPARATUS AND METHOD FOR FILE NUMBER RE-MAPPING FOR DISCONNECTED OPERATIONS IN A CLIENT-SERVER NETWORK

BACKGROUND OF THE INVENTION

1. Field of the Invention

The present invention relates to file access from a client computing station to a server across a network. More particularly, the invention relates to file creation by the client while the server or network is inoperative.

2. Description of Prior Art

In a client/server computing system operating over a network, file system architectures are employed in which the server alone has complete control over the selection of file numbers for newly-created files. For example, UNIX (AT&T Bell Laboratories Operating System) systems operating in a networked server/client environment, are designed so that the server controls the selection of file numbers for all newly-created files. Whenever an application program running on a client needs to create a new file, the client correspondingly requests that the server allocate a new file with an unused file number. Under normal operating conditions, such a file system architecture can operate smoothly. However, if the server becomes inoperative (i.e., crashes) or if the network connection between the server and client becomes inoperative, then application programs operating on the client are unable to create new files without substantial problems.

UNIX-based operating systems, a file number, known as an inode, index node, or inode number, is an attribute of each file maintained in the file system. Every UNIX file has an unique inode that references information describing the various characteristics of the file. This information includes metadata information such as file type, file access permission, file ownership, time stamps indicating the last modification of the file, and an array of indices pointing to the disk location of the data blocks for the file. These inodes, along with the metadata indexed by the inode, are maintained in an inode table. The inode table is maintained at a well known disk location in the server of a UNIX system.

Maintaining a consistent file number for a file is a basic precept in a UNIX system and many application programs written for UNIX operating systems may rely on the assumption that the file number for a given file will never change. Therefore, it is imperative that the operating system provide to application programs a consistent and unique file number for a given file.

In order to maintain unique and consistent file numbers for each file, the server is solely responsible for determining file numbers for files, which includes the responsibility for originating new file numbers for new files. The client is obligated to follow and use the file numbers established by the server. File numbers are selected by the server in a non-deterministic manner so that it is not possible to anticipate the next file number which the server will assign to a new file.

Since the client depends on the server for the allocation of file numbers for newly created files, the client is generally unable to create a new file if the server becomes unavailable. Where the server and client are connected over a network, the server can become unavailable, for example, when the server becomes inoperative (i.e., crashes) or the network connection between client and server loses integrity (i.e., disconnects).

Prior to the present invention when the server or network became inoperative, clients were generally unable to create new files until the server again became available.

One prior approach addressing this problem was implemented by a file system, known as Coda, at Carnegie Mellon University. The Coda approach involved the server preallocating a fixed number of file numbers for clients to use while the server is not available. The Coda approach provides only a limited solution to the problem, since clients can only create as many new files as there are pre-allocated file numbers. If, in a networked system having a large number of clients connected to a single server, the server becomes unavailable for a long period of time, it is possible that clients will exhaust all of the pre-allocated file numbers and thereafter clients will be unable to create any new files while the server is unavailable.

Additionally, file number preallocation inherently requires that reserves of file numbers are maintained during normal server operations regardless of whether the file numbers are actually used. File numbers are a needed finite resource for use by clients when creating new files. By reserving or pre-allocating file numbers during normal operations of the server, file number pre-allocation consumes a server resource which should be available for use by clients at all times. In a networked system having a large number of clients connected to a single server, it is possible that during normal operations clients will exhaust all of the available non-pre-allocated file numbers, and thereafter clients will be unable to create new files during normal operating conditions because the server is holding usable file numbers in reserve.

Finally, pre-allocating file numbers requires modifications to industry standard protocols that are used to implement networked file systems. Oftentimes, it is not commercially viable to market a system that changes industry standard protocols.

SUMMARY OF THE INVENTION

In accordance with this invention, the above problems have been solved by providing the client with the ability to create a new file with a unique file number whenever the server is unavailable. In a method implementation of the invention, this is accomplished by remapping file numbers assigned by the server to file numbers assigned by the client in a computer network. Responsive to an application program request to create a new file while the server is unavailable, a table for storing and remapping file numbers is created. The client assigns a new file number for the new file created while the server is unavailable, and stores the new file number in the table. The file number assigned by the client can be selected to be unique from the file numbers previously used or accessed by the client.

Upon the server becoming available, the true file number, assigned by the server, of the file is obtained from the server and stored in the table. The true file number assigned by the server is mapped in the table to the file number assigned by the client, therefore permitting the client to transparently create the new file while the server is unavailable.

The table can be structured with a first column and a second column, the first column for storing file numbers assigned by the server, and the second column for storing file numbers assigned by the client. The client accesses the table in response to any request for the file number of the new file created, and reports the appropriate file number for the new file.

In another embodiment of the invention, any conflicts between the new file number assigned by the client and another file number assigned by the server are detected by writing a flag in the table mapping to the new file number assigned by the client. File numbers assigned by the server are compared to the table entries of new file numbers assigned by the client, thereby detecting instances where the file number assigned by the server conflict with new file numbers assigned by the client.

Any detected conflicts between file numbers are resolved by assigning a second new file number, selected by the client, to the new file. The second new file number is mapped to the true file number assigned by the server. In this manner, the conflict between the new file number of the client and the other file number created by the server is eliminated.

The above computer implemented steps in another implementation of the invention are provided as an article of manufacture, i.e., a computer storage medium containing a computer program of instructions for performing the above described steps.

In a machine implementation of the invention, an apparatus remaps file numbers selected by a client and a server in a computer network so that the client can create a new file while the server is unavailable. A file number selection module selects a first file number for assignment by the client to the new file, and a file number request module requests a second file number assigned by server corresponding to the new file. A file number table stores the first file number and the second file number in the table, and the first file number is mapped in the file number table to the second file number so that file numbers are consistently maintained.

In another embodiment of the invention, a reporting module reports the first file number to an application program responsive to a request from the application program for access to the new file. A signaling module marks the first file number, stored in the table, as in possible conflict with an other file number assigned by the server. A conflict detection module determines if the first file number assigned by the client is in a conflict with other file numbers assigned by the server. And a conflict correction module corrects the conflict between the first file number assigned by the client and the other file number assigned by the server.

The great utility of the present invention is that the client can transparently create a new file even though the server is unavailable to create a file number for the new file.

Still another utility of the present invention is to permit the creation of new files by the client while the server is unavailable without the need to pre-allocate file numbers.

Still another utility of the present invention is to permit the client to create new files while the server is unavailable without having to modify the server file system or deviate from standard network protocols for server operations maintained in the industry.

Still another utility of the present invention is to provide consistent use of file numbers for files while the server is unavailable.

The foregoing and other useful features and advantages of the invention will be apparent from the following more particular description of a preferred embodiment of the invention as illustrated in the accompanying drawings.

DETAILED DESCRIPTION OF PREFERRED EMBODIMENTS

Figure 1:
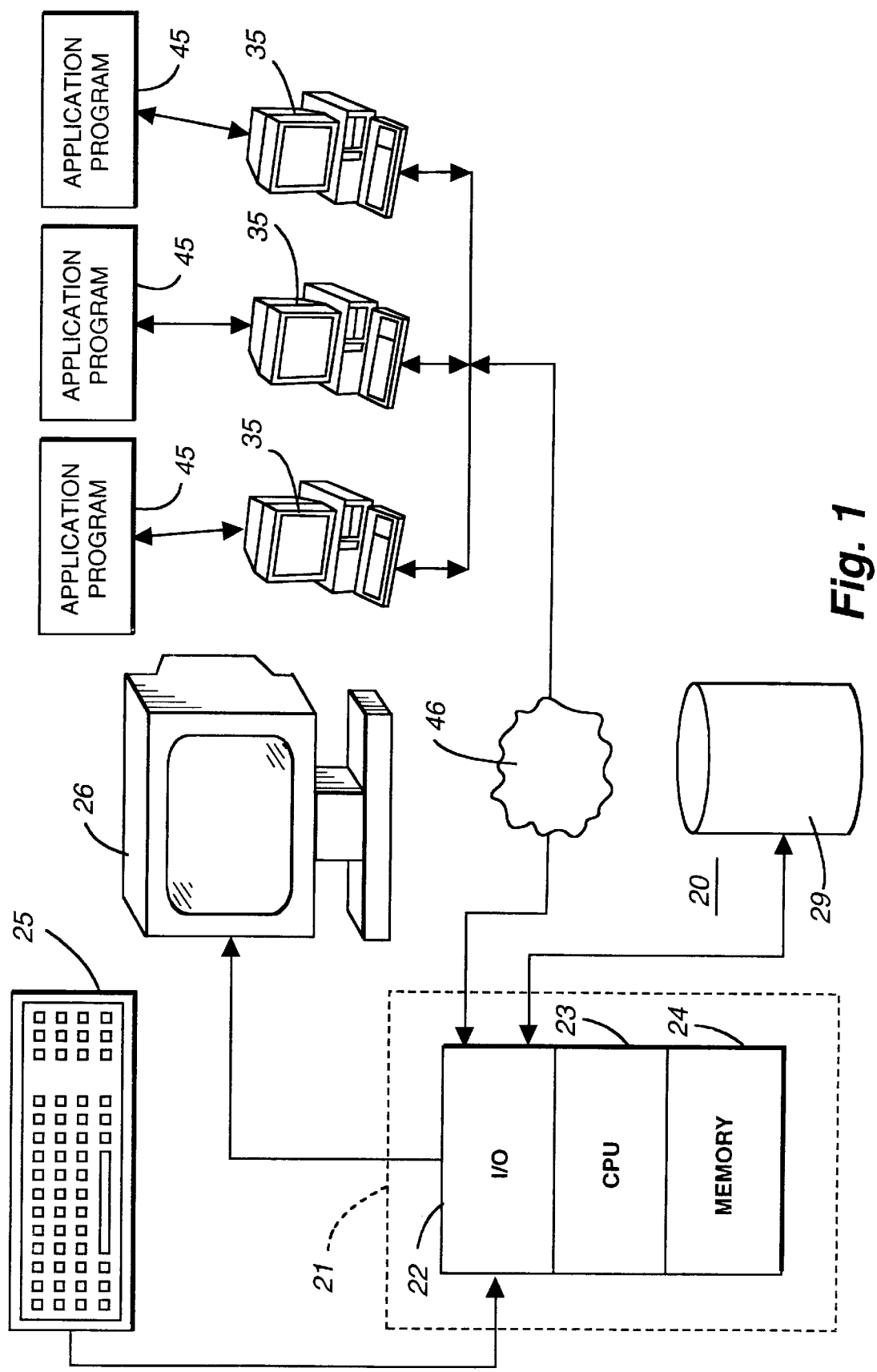
FIG. 1 illustrates a distributed processing computing system with a server and multiple clients connected in a communication network to perform the logical operations of the invention.

The embodiments of the invention described herein are implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

The present invention provides the client with the ability to create a new file whenever the server has become unavailable. The client utilizes a table, described below in greater detail, for storing and mapping file numbers. The table can be structured to have a column for storing file numbers created by the server, and a column for storing file numbers created by the client.

Since the server normally creates file numbers for every file, the client is faced with the dilemma of which file number to use. The client begins by selecting a "free" file number which is not presently in use, and assigning this "free" file number to the new file. The server, however, ultimately controls the creation of the file number for that file. When the server again becomes available, the client requests the server create a new file, and the server assigns a file number to the file. Therefore, the present invention creates a file number table for storing and respectively mapping the client's created file number and server file number; this table is maintained in memory by the client. The client will use this file number table to consistently report the appropriate file number to all applications software running on the client which access files created during disconnected operations. If, for example, the client created a file number of 2345, later corresponding to a server file number of 9876, the client would maintain the file number of 2345 to all applications software running on the client. When the client reboots, subsequent accesses to the file will correspond to the proper file number assigned by the server. In this manner, the present invention permits the client to create a new file number while the sever is unavailable.

Another important aspect of the present invention relates to the situation where the client has picked a file number which happens to already exist and be associated with a file on the server. This situation is known as a "conflict" of file numbers. While the server generally maintains a master list of all file numbers for all files located on the system, the client only maintains a local copy of file numbers needed by application software running on the client. The client copy of file numbers is not a comprehensive list of all file numbers maintained by the server, as it would be inefficient for the client to maintain the entire list. It is therefore possible that when the server becomes unavailable, the client, when creating a new file, picks a "free" file number which the server has already assigned to a different file. It is also possible that after the server becomes available, the server will assign to a different file the same file number as selected by the client during disconnected operations.

In order to detect potential conflicts of file numbers, the present invention teaches that the client "flag" in the file number table all file numbers created by the client. For each client file number maintained, the client creates a separate entry in the table by copying the client file number to the server column, and maps this file number, now in the server column, to zero in the client file number column. In this manner, the file number maintained in the server column of the table is flagged as an invalid number which enables the client to detect when a file number conflict exists.

When the client subsequently learns that the file number it created has been allocated by the server to a different file, the client must take some action to correct this conflict of file numbers. Under the preferred embodiment of present invention described below, the client creates another new "free" file number and writes it in the file number table 100 to map to the server file number which caused the conflict. In this manner, the client represents unique file numbers to the application software operating thereon. While it is possible that this new "free" file number chosen by the client has been or will be allocated by the server, it is very unlikely that another conflict would arise. If another conflict with the new file number arises, the client would simply create another new file number and write it in the table at a location corresponding to the conflicting server file number. This process would continue until a Genuinely "free" file number, not allocated by the server, would be chosen.

As an example, assume during disconnected operations the client creates a new file and assigns it a file number of 3456. The server then becomes available again. The client reports a new file to the server, and the server assigns the file number of 9876 to the file. The server file number of 9876 is the "true" file number on the system for the new file. In its file number table, the client maintains an entry mapping server file number 9876 to client file number 3456. In order to flag the client selected file number for possible conflicts with server file numbers, the client also creates another entry in the file number table of 3456 in the server column of the table, and maps that file number to a client file number of zero. For any subsequent access to files on the server, the client compares the actual file number obtained from the server to the server file numbers maintained in the table. If a file has a server file number of 3456, the client detects that a conflict of file numbers, exists since the table has server file number 3456 mapped to zero. Therefore, the client can resolve the conflict by creating a new file number (i.e., 101) and writing this new file number under the client column entry mapping to the server file number 3456. Hence, any accesses to server file number 3456 will be consistently reported as 101 to the application programs. Note that the client would again flag possible subsequent conflicts in file numbers by creating a new entry in the table under the server file number of 101, and mapping this entry to a client file number of zero.

In accordance with the invention, users at remote workstations in a network, such as client processors 35, communicate through the network to a computer server 20 as shown in FIG. 1. Server 20 includes processor 21 having an input/output section 22, a central processing unit 23, and a memory section 24. The input/output section 22 is optionally connected to a keyboard 25, a display or monitor 26, and a disk storage unit 29. The input/output unit 22 includes a communications adaptor communicating on the network 46 to the remote client stations 35. Application programs 45 operate on client station 35 which may access files maintained by server 20. The computer program products to effectuate the apparatus and methods of the present invention may reside in the memory section 24, or on the disk storage unit 29 or similar storage media (not shown), or reside storage mediums used by clients 35. Examples of computing systems that may be used as either a server 20 or a client 35 include the SPARC[1]™ (scaleable processor architecture) systems offered by Sun Microsystems™, Incorporated, personal computers offered by IBM Corporation and by other manufacturers of IBM compatible personal computers and systems running the UNIX[2](AT&T Bell Labortories Operating System), OS/2[3](Operating Systems/2), HP-UX (Hewlett-Packard UNIX), AIX (Advanced Interactive Executive), DOS (Disk Operating System), etc. operating systems.

[1]SPARC is a trademark of Sun Microsystems, Inc. [2]UNIX is a trademark Licensed by X/Open Company Ltd. [3]OS/2 and AIX are trademarks of IBM Corporation.

Client 35 and server 20 communicate over network 46 which provides client 35 with access to the files maintained on disk 29 of the server. Server 20 maintains on disk 29 a table of file numbers for the entire network and file data for each file.

File creation by a client is generally performed in response to a request by an application program 45, running on the client 35, for a new file. The client must normally request that the server create a new file and allocate a new file number. Under these circumstances, if server 20 is unavailable either because the network connection 46 is inoperative, server 20 has crashed, or otherwise, then the client 35 would be unable to continue with the creation of a new file. As will be explained, the present invention permits the client to create new files despite the unavailability of the server.

Figure 2:
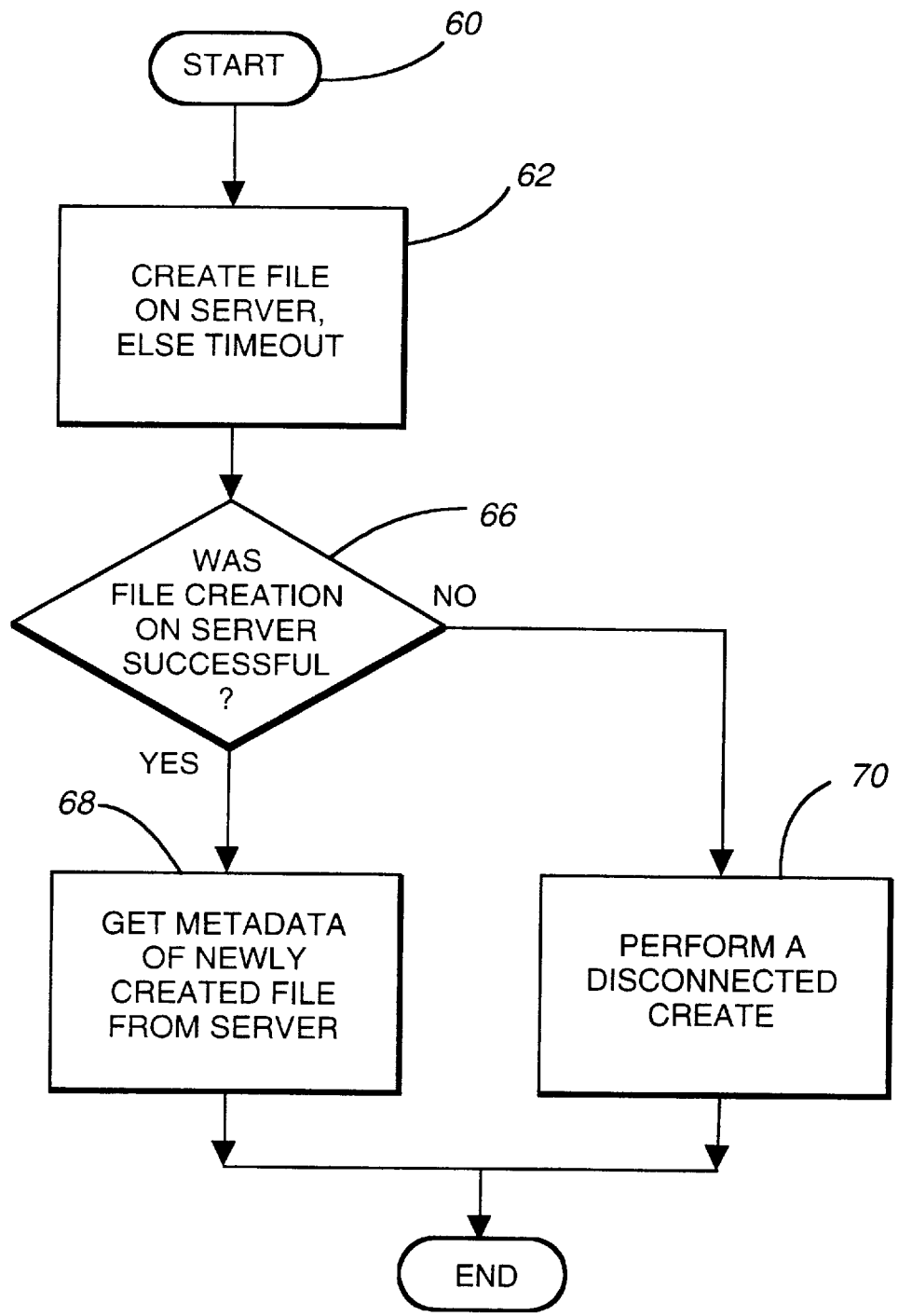
FIG. 2 illustrates the logical operation of file creation of the present invention.
Figure 3:
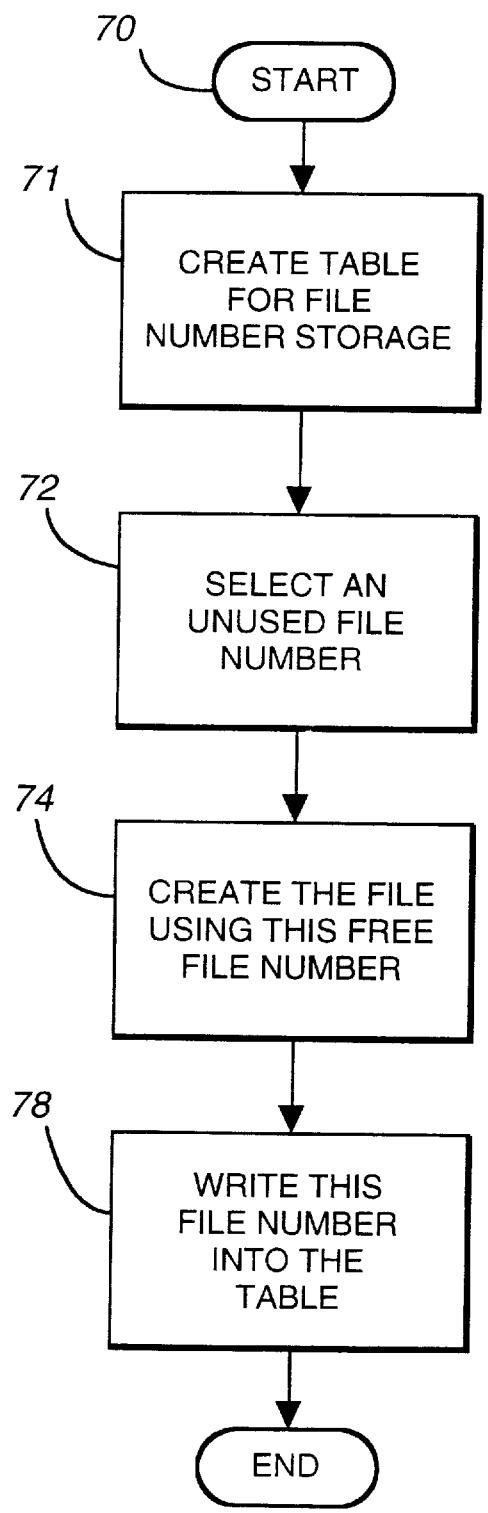
FIG. 3 illustrates the logical operation of file creation when the server is unavailable under the present invention.

FIGS. 2–3 show the operations involved in creating a file when the server has become unavailable. Beginning with FIG. 2 at operation 60, the client creates the file on the server at operation 62 as is normally done in a client/server networked computing system, and then determines at decision operation 66 if this file creation was successful. If the server and network are both operative, then the file creation was successful and the client proceeds with its normal file processing. For instance, at operation 68, the client obtains metadata of the newly created file from the server, which can include attributes of the newly created file such as the file number.

However, if operation 66 detects that the file creation on the server was unsuccessful, then the server is unavailable possibly because the server or the network have become inoperative. The client therefore performs at operation 70 the steps to create a new file under disconnected conditions, as shown in FIG. 3.

In order to perform operation 70 (FIG. 3) of creating a new file under disconnected conditions, the client allocates a new file number for this file. In past networked computing systems, this operation would simply not be possible since the server is ultimately responsible for the creation and allocation of file numbers for newly created files. While the preferred embodiment of present invention does not alter this fundamental concept, the embodiments of the present invention permit the client to create and maintain a file number for a new file while also permitting the server to allocate a different file number for the same file.

Figures 5A, 5B:
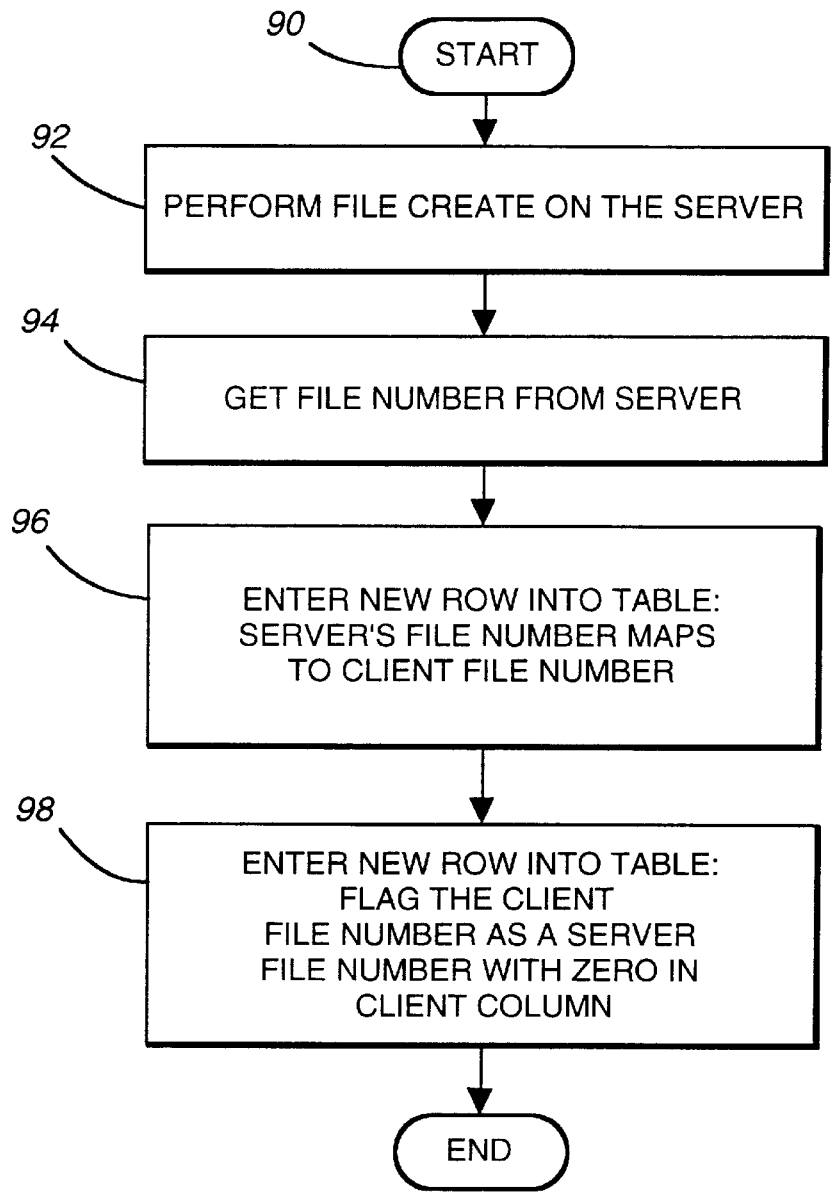
FIG. 5, composed of FIGS. 5A through 5B, is a flow diagram illustrating mapping file numbers in accordance with the present invention.

In FIG. 3, the flow of operations for performing a file creation under disconnected conditions begins at operation 71. Operation 71 creates a table 100 (FIG. 5A) for storing and remapping file numbers assigned by the client and assigned by the server. While under the preferred embodiment of the present invention this table is created during the period of server unavailability, it will be apparent to one skilled in the art that the table could be created at various other instances depending on the particular implementation. For example, the table could be created after the server becomes available again between operations 94 and 96 (FIG. 5B).

Referring back to FIG. 3, operation 72 selects a file number that is presently unused. The client scans its record of used file numbers, which could be kept in a disk cache, to find a "free" file number which has not been previously allocated by the server. As previously explained, the list of existing file numbers maintained by the client need not be a comprehensive list of all file numbers allocated by the server for the networked system. It is therefore possible that the file number which the client determines is "free" and unused will in fact conflict with an file number allocated by the server. As will be discussed below, the logical operations in FIGS. 6–7 provide a solution to this possible conflict of file numbers.

After the client has obtained a "free" file number, operation 74 (FIG. 3) uses this "free" file number to create the new file. As previously mentioned, the file number is an attribute of the file which an application program, running on the client, may utilize. Operation 74 associates the newly created file with a specific file number so that the application program's request to create a new file is satisfied without substantial delay. Operation 78 writes this file number into the table 100 maintained by the client.

Figure 4:
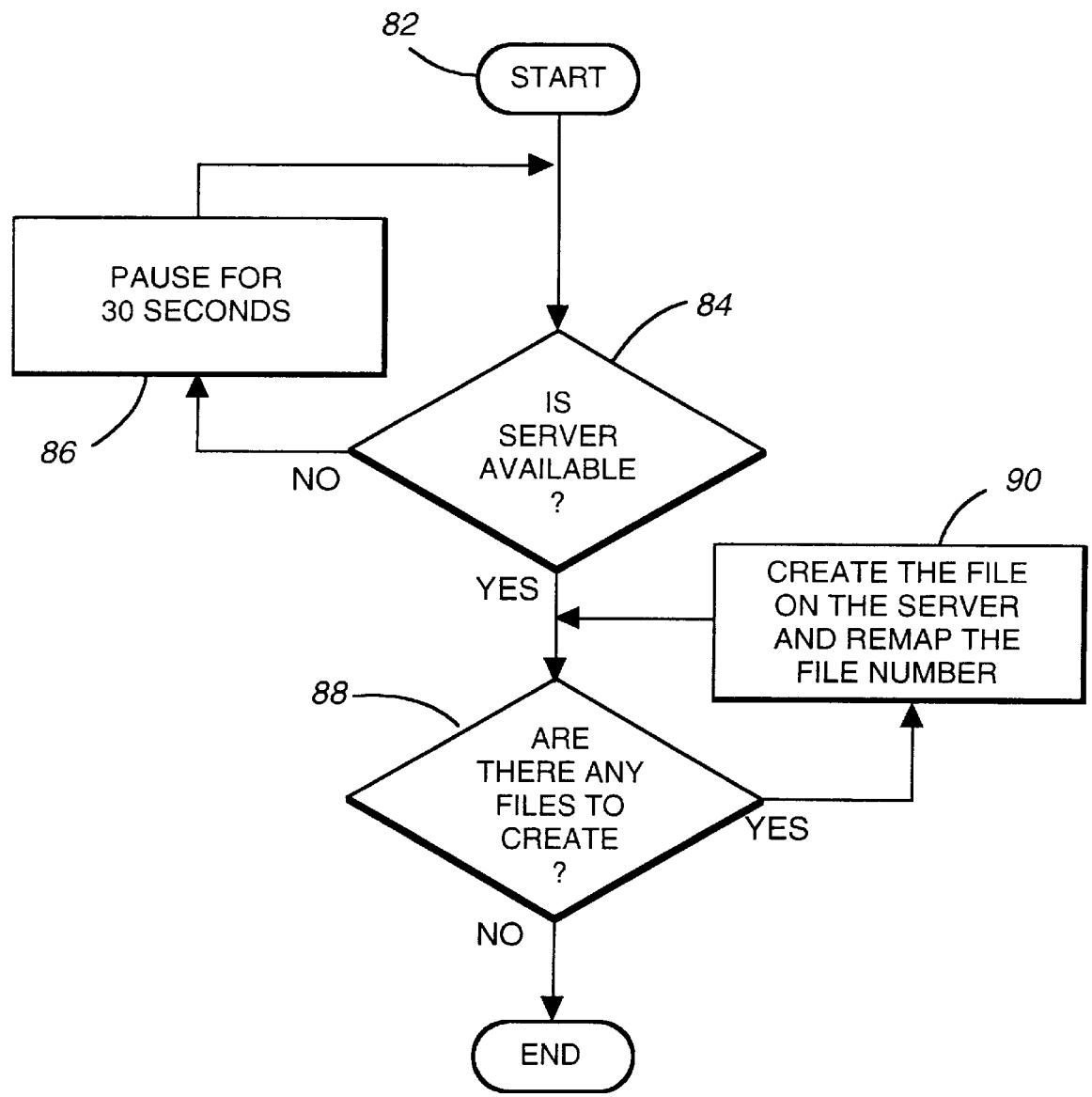
FIG. 4 illustrates the logical operations performed under the present invention when the server becomes available after a new file was created.

FIG. 4 shows the sequence implemented by the client to determine if the server or network has again become available, as well as the steps involved upon the server becoming available. Operation 84 determines if the server or network has become operative again. For example, operation 84 can "ping" the server or network periodically (i.e., 30 second intervals) until the server responds. Upon operation 84 determining that the server is available, decision operation 88 determines if there are any files to create. For instance, operation 88 could examine the contents of table 100 for non-zero entries indicating that a new file and file number was created by the client while the server was unavailable. If a file was created by the client while the server was unavailable, operation 90 creates the file on the server and remaps the file numbers, as shown in the operations of FIG. 5B.

FIGS. 5–7 illustrate the remapping operations after the server has become available. FIG. 5A shows the file number table 100 maintained by the client to remap file numbers. FIG. 5B shows the logical operations of file number remapping. FIGS. 6–7 show the file number conflict detection and resolution operations.

The client utilizes the file number table 100 of FIG. 5A. The table can be maintained in volatile memory of the client so that file numbers remapping information is maintained only as needed by the application programs running on the client.

The file number table 100 has a server column 102 and a client column 104. Entries in the table reflect the file numbers assigned either by the server or by the client, and the row positions of the entries indicate the mapping between the assigned file numbers. For instance, in FIG. 5A, the client-assigned file number 3456 corresponds to the server file number 9876. The client will report a file number of 3456, created by the client during the unavailability of the server, to applications which the client previously represented a file number of 3456. However, the client knows that the "true" file number for this file maintained on the server is 9876. Furthermore, the client accesses the table after disconnected operations whenever the client receives a file number from the server. As will be explained in relation to FIG. 6, the client uses the contents of the table to determine if a conflict of file numbers exists.

In FIG. 5B, operation 92 creates the file on the server so that the server will assign a unique file number for the newly-created file. The client has already selected and assigned a "free" file number during the disconnected operation at operations 72–74 as shown in FIG. 3 and described above.

Because the server is ultimately responsible for allocating new file numbers, and because the client must consistently report file numbers to software applications running on the client, the client needs to obtain a "true" file number from the server for the file. Operation 94 obtains the newly-assigned file number from the server, so that this file number can be remapped in table 100 to the "free" file number assigned by the client.

After the file number assigned by the server for the newly-created file has been obtained, operation 96 creates a new row into the table 100 which will contain entries for the newly-created file. The client enters the "true" file number, assigned by the server, into the row under the server column 102. The client also enters, in the client column 104, the "free" file number previously assigned by the client corresponding to this particular file. The "true" server file number is now mapped to the "free" client file number.

Operation 98 flags, or signals, the client file number in order to detect possible conflicts between the client file number and other server file numbers. The client creates another row in table 100. The client-assigned file number is entered under the server column 102 of the table and the client column 104 is filled with a zero, indicating an invalid file number. The client-assigned file number has now been flagged. If the client subsequently obtains from the server a file number which the client has previously allocated during the unavailability of the server, then a file number conflict exists.

As previously discussed, the purpose of maintaining the file number table 100 is to remap the "true" server-assigned file numbers to the client-assigned file numbers. In this manner, from the perspective of the server, consistency of file numbers is maintained; and from the perspective of software applications running on the client, consistency of file numbers is also maintained despite the fact that a file was created while the server or network was inoperative.

Figure 6A:
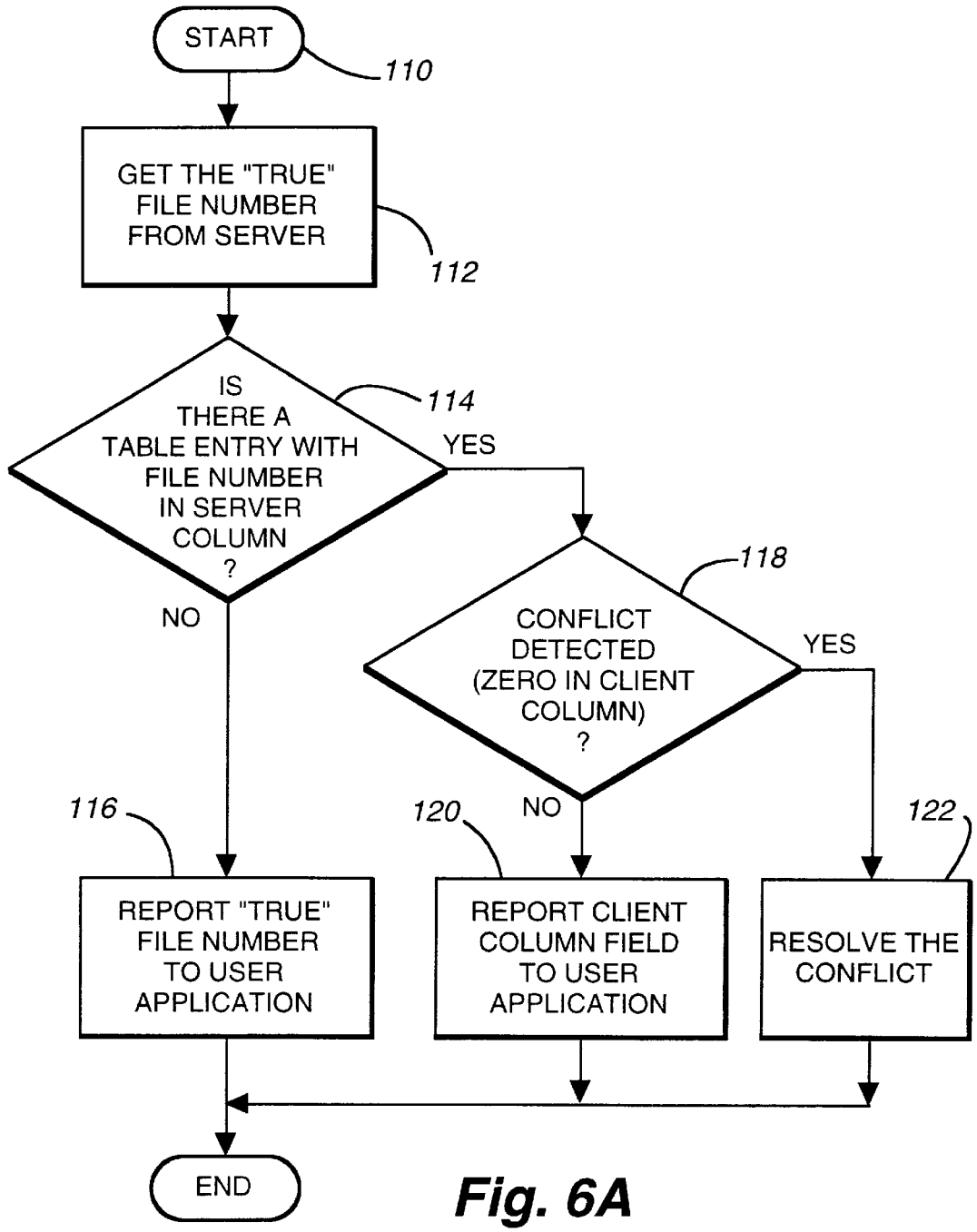
FIG. 6, composed of FIGS. 6A through 6B, is a flow diagram illustrating the reporting of file numbers and the detection of conflicts in file numbers in accordance with the present invention.
Figure 6B:
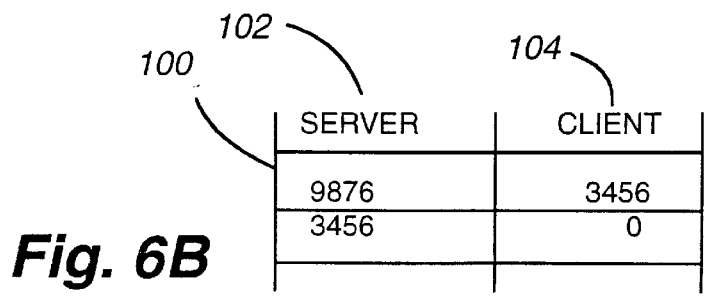

FIGS. 6A–6B show the operations by which the client reports the file number of a file to an application program running on the client, and detects a file number conflict.

Reporting a file number begins at operation 110 in response to an application program's request for access to a file. Before the client can report a file number to the application, the client needs to determine if the requested file has a file number which needs to be remapped using the entries contained in table 100.

Operation 112 obtains from the server the "true" file number assigned by the server for the requested file. Operation 114 determines whether the client needs to report to the application software a file number different than the "true" file number maintained by the server.

Using the "true" file number obtained from the server by operation 112, operation 114 scans the server column 102 of the file number table 100 to determine if there is a matching entry corresponding to this "true" server file number. If there is not a match between the "true" server file number and any of the file numbers in the server column 102 of table 100, then operation 116 reports the "true" server file number, obtained from operation 112, to the user application. Under these circumstances, no remapping of file numbers was needed.

If, however, the "true" file number obtained from the server for the requested file matches an entry in the server column 102 of table 100, then this "true" server file number will need to be remapped by the client using the contents of table 100. The client must also determine if this "true" file number conflicts with a file number previously allocated by the client during the period of disconnected operation.

In order to detect file number conflicts, the client has already flagged client-assigned file numbers by placing them in the server column 102 mapped to a zero in the client column 104, as previously explained at operation 98 and shown in FIGS. 5A–5B. Upon finding a match between the "true" server file number, obtained from operation 112, and a file number in the server column of the table, operation 118 examines the client column of the entry to determine if a zero exists in the client column. If the client column of the entry is non-zero, then no file number conflict exists, and operation 120 reports the file number contained in the client column to the user application, as similarly performed by operation 116. For example, using the entries shown in table 100 of FIG. 6A, if a software application running on the client requested access to a file corresponding to a server-assigned file number of 9876, the client would examine the server column of table 100 to locate an entry having a file number of 9876. The client would then check the client column of the same row to test if this entry was zero. Since the client column for this row entry is 3456, and not zero, the client simply needs to report to the user application that the file number for the requested file is 3456.

If operation 118 (FIG. 6B) determines that the client column for the row entry is zero, then a conflict between file numbers has been detected. In other words, the client created a file number which the server has also allocated. Since the server is ultimately responsible for file number allocation, operation 122 transparently resolves the conflict of file numbers, as indicated in FIGS. 6B and 7.

Figures 7A, 7B:
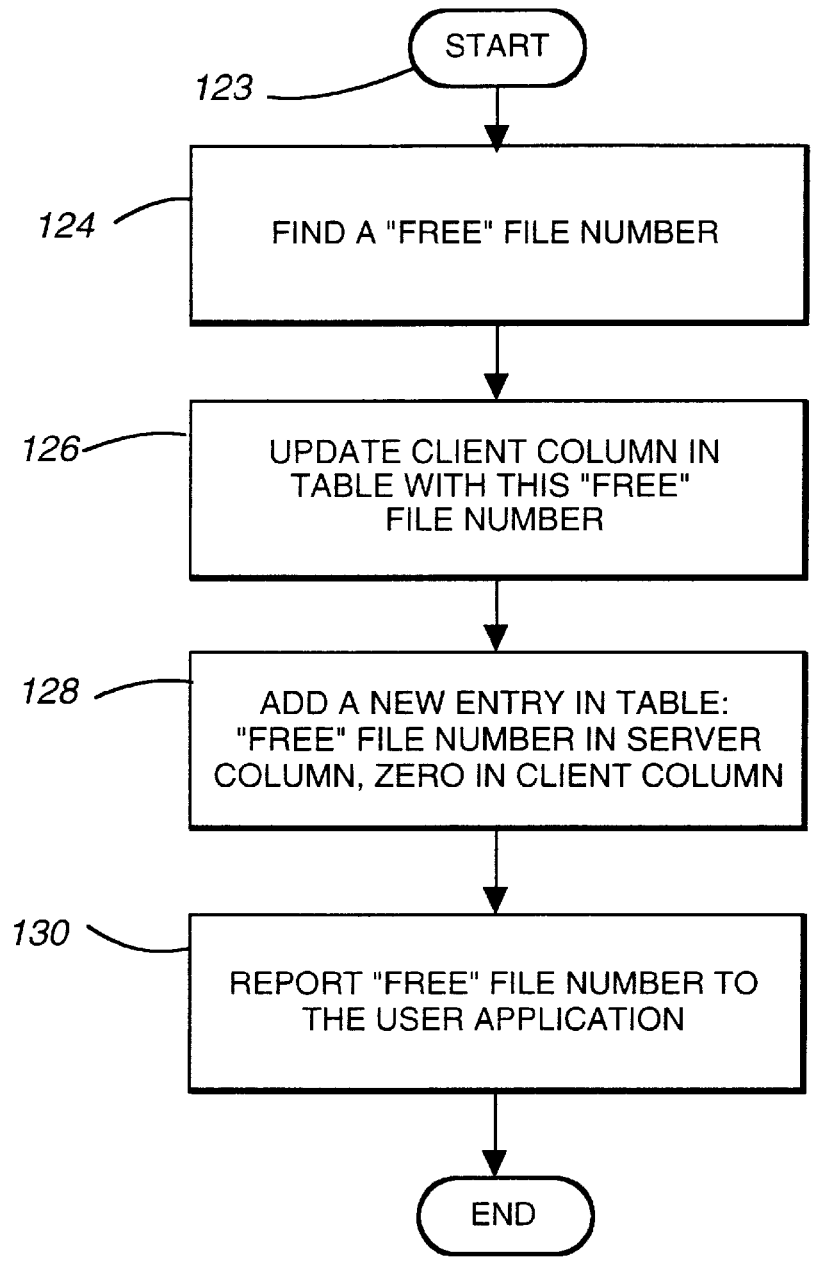
FIG. 7, composed of FIGS. 7A through 7B, is a flow diagram illustrating the resolution of a conflict of file numbers in accordance with the present invention.

Referring to FIG. 7B, the client resolves the detected conflict of file numbers beginning at operation 124. Operation 124 finds a new and different "free" file number so that the new file number chosen is not already being used, as previously explained at step 72 (FIG. 3). Using the file number table 100, operation 126 (FIG. 7B) enters the table at the row location where the file number conflict was detected by operation 118 (FIG. 6). Operation 126 then updates the client column 104 at this row with the newly-acquired "free" file number.

Operation 128 then adds a new row entry in the table, and writes the new "free" file number in the server column 102 and a zero in the client column 104, similarly performed by step 98 of FIG. 5B. The conflict between file numbers has now been resolved by assigning and mapping a new and different "free" client file number to the server file number. Again, the "free" client file number is flagged so that possible future conflicts can be detected and corrected. Having resolved the conflict between file numbers, operation 130 reports the new "free" file number to the user application. Processes 124–130 of resolving a collision can be repeated until the client chooses a file number which is not in conflict with a server file number.

Referring to FIG. 7A as an example, client-assigned file number 3456 is mapped to a "true" file number of 9876. The client subsequently discovers that the server has allocated file number 3456 to another file, resulting in a conflict of file numbers. To resolve this conflict, a new "free" file number of 101 is selected and mapped to the client assigned file number of 3456. In this manner, any access by an application program running on the client to the file having server file number 3456 is reported to the application as 101. Access to the server file having server file number 9876 is still reported to the application as 3456. Therefore, the application sees file numbers 3456 (mapping to server file number 9876) and 101 (mapping to server file 3456). File number 101 is also flagged with a zero to detect possible future conflicts.

Once the client has created a new file and the file number table is created and maintained by the client, the present invention fits into the overall operation of the client/server system in the following manner. When the client accesses a file from the server, the client first obtains the "true" file number for the file from the server. Having obtained the "true" server file number for the file, the client scans the server column of the table. If no matching entry exists under the server column of the table, then no remapping of file numbers is needed. If, however, a matching entry exists (i.e., the "true" file number obtained from the server matches an entry maintained in the server column of the table), then the client needs to remap the "true" server file number to the file number created by the client, and this may involve resolving a file number conflict by creating a new file number in the client column of the table, as previously described.

The preferred embodiments of the present invention are transparent to both the server and the applications software running on the client. Clients and application programs operating therein are now able to create files while the server is unavailable.

Figure 8:
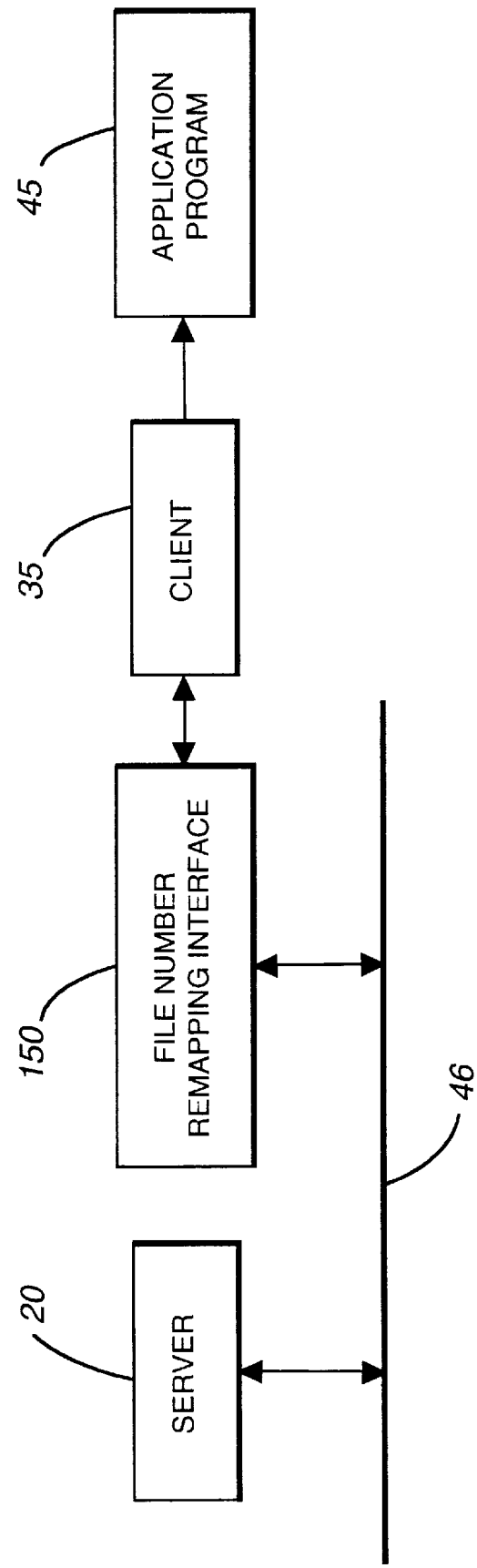
FIG. 8 illustrates an alternate embodiment of the preferred embodiments.

FIG. 8 illustrates an alternate embodiment of the present invention. File number remapping interface 150 provides file number information between server 20 and application program 45. Interface 150 could contain table 100 (FIG. 5A) and perform all of the operations performed by the client as discussed herein. Interface 150 could be implemented as a hardware device or as a software interface running on a client. Interface 150 would thereby provide file number remapping which would be transparent to the server, the application program, and the client.

Although a preferred embodiment of the present invention has been described using numeric characters as file numbers, it will be apparent to one skilled in the art that the invention will be applicable to situations where non-numeric, alpha-numeric characters, or other symbols, are used as file numbers.

While the invention has been particularly shown and described with reference to preferred embodiments thereof, it will be understood by those skilled in the art that various other changes in the form and details may be made therein without departing from the spirit and scope of the invention.

What is claimed is:

1. In a computer network having a server and a client, an apparatus for remapping file numbers selected by a client to file numbers selected by a server so that the client can create a new file while the server is unavailable, said apparatus comprising:

a reporting module reporting the first file number to an application program responsive to a request from the application program for access to the new file;

a file number selection module selecting a first file number for assignment by the client to the new file when the server is unavailable;

a file number request module requesting a second file number assigned by said server when said server becomes available corresponding to the new file; and a file number table storing said first file number and said second file number; said first file number mapped in the file number table to said second file number so that the client can create the new file while the server is unavailable.

2. The apparatus of claim 1, further comprising:

a signaling module marking in the file number table said first file number as in possible conflict with an other file number assigned by the server, said signaling module writing in said file number table the first file number as a file number created by the server so that other file numbers created by the server can be matched against said first file number.

3. The apparatus of claim 2, further comprising:

a conflict detection module, responsive to said signaling module, detecting if the first file number assigned by the client is in a conflict with the other file number assigned by the server.

4. The apparatus of claim 2, further comprising:

a conflict correction module, responsive to said conflict detection module, correcting the conflict between the first file number assigned by the client and the other file number assigned by the server.

5. In a computer network having a client and a server where the server is responsible for creating a file number for a new file, a method for remapping file numbers created by the server to file numbers created by the client, the method comprising the computer implemented steps of:

creating and maintaining in the client a table for storing file numbers;

assigning in the client a new file number for the new file created while the server is unavailable;

storing in the table said new file number created by the client;

upon the server becoming available, obtaining from the server a true file number assigned by the server to the new file created while the server was unavailable;

storing in the table said true file number assigned by the server to the new file created; and mapping in the table the true file number assigned by the server to said new file number assigned by the client, thereby permitting the client to transparently create the new file while the server is unavailable.

6. The method of claim 5, wherein the step of assigning further comprises the step of:

selecting a new file number as unused based on the file numbers previously used by the client.

7. The method of claim 5, further comprising the steps of:

creating a first column in said table for storing file numbers assigned by the server; and creating a second column in said table for storing file numbers assigned by the client.

8. The method of claim 5, further comprising the steps of:

accessing the table by the client in response to any request for the file number of the new file; and reporting appropriately the file number for the new file.

9. The method of claim 5, further comprising the steps of:

detecting a conflict between the new file number assigned by the client and an other file number assigned by the server.

10. The method of claim 9, wherein the step of detecting a conflict further comprises the steps of:

writing a flag in the table mapping to the new file number assigned by the client; and comparing said other file number assigned by the server to the new file number assigned by the client stored in the table, thereby detecting instances where said other file number conflicts with the new file number.

11. The method of claim 9, further comprising the steps of:

resolving conflicts between the new file number and the other file number.

12. The method of claim 11, wherein the step of resolving conflicts further comprises the steps of:

assigning a second new file number to the new file, said second new file number selected by the client; and mapping said second new file number to the true file number assigned by the server, thereby eliminating the conflict between the new file number assigned by the client and the other file number assigned by the server.

13. A computer program storage medium readable by a computing system and encoding a computer program of instructions for executing a computer process for remapping file numbers created by a server to file numbers created by a client in a computer network, said computer process comprising the steps of:

creating and maintaining in the client a table for storing file numbers;

assigning in the client a new file number for the new file created while the server is unavailable;

storing in the table said new file number created by the client;

upon the server becoming available, obtaining from the server a true file number assigned by the server to the new file created while the server was unavailable;

storing in the table said true file number assigned by the server for the new file created; and mapping in the table the true file number assigned by the server to said new file number assigned by the client, thereby permitting the client to transparently create the new file while the server is unavailable.

14. The computer program storage medium of claim 13 where, in the computer process, the step of assigning further comprises the step of:

selecting a new file number as unused based on the file numbers previously used by the client.

15. The computer program storage medium of claim 13 where the computer process further comprises the steps of:

accessing the table by the client responsive to any request for the file number of the new file; and reporting appropriately the file number for the new file.

16. The computer program storage medium of claim 13 where the computer process further comprises the step of:

detecting a conflict between the new file number assigned by the client and an other file number assigned by the server.

17. The computer program storage medium of claim 16 where, in the computer process, the step of detecting a conflict further comprises the steps of:

writing a flag in the table mapping to the new file number assigned by the client; and comparing said other file number assigned by the server to the new file number assigned by the client stored in the table, thereby detecting instances where said other file number conflicts with the new file number.

18. The computer program storage medium of claim 16 where the computer process further comprises the step of:

resolving conflicts between the new file number and the other file number.

19. The computer program storage medium of claim 18 where, in the computer process, the step of resolving conflicts further comprises the steps of:

assigning a second new file number to the new file, said second new file number selected by the client; and mapping said second new file number to the true file number assigned by the server, thereby eliminating the conflict between the new file number assigned by the client and the other file number assigned by the server.

20. In a computer network having a server and a client, an apparatus for remapping file numbers selected by a client to file numbers selected by a server so that the client can create a new file while the server is unavailable, said apparatus comprising:

a file number selection module selecting a first file number for assignment by the client to the new file when the server is unavailable;

a file number request module requesting a second file number assigned by said server when said server becomes available corresponding to the new file;

a file number table storing said first file number and said second file number; said first file number mapped in the file number table to said second file number so that the client can create the new file while the server is unavailable; and a signaling module marking in the file number table said first file number as in possible conflict with another file number assigned by the server.

* * * * *